2,979,456

PROCESS FOR THE CONTROL OF BACTERIA

Edward O. Bennett, Houston, Tex., and Edward B. Hodge, Terre Haute, Ind., assignors to Commercial Solvents Corporation, New York, N.Y., a corporation of Maryland No Drawing. Filed Oct. 3, 1958, Ser. No. 765,036

2 Claims. (Cl. 252—8.55)

Our invention relates to the control of sulfate reducing bacteria in water flooding operations used in the secondary recovery of petroleum oils, and more particularly, to controlling such organisms by incorporating into the flooding water effective amounts of bis(2-aminoisobutoxy)phenylmethane.

U.S. Patent 2,839,467 lists many of the problems found in the secondary oil recovery art and the means whereby some of these problems have been solved. The problem of controlling sulfate reducing bacteria is ever present and always difficult, as the growth of the microorganisms is not controlled by economically practicable amounts of many bactericides generally utilized in bacterial control and the microorganisms sometimes become resistant to generally used bactericides.

We have now discovered that sulfate reducing microorganisms are economically controlled by the addition of bis(2 - aminoisobutoxy)phenylmethane to the flooding water. A process for the preparation of bis(2-aminoisobutoxy)phenylmethane is disclosed in U.S. Patent 2,363,464.

The usual procedure for the treatment of water to be utilized in flooding operations is to produce a concentrate of the bactericide in water and then continuously inject this concentrate into the water to be used in flooding operations at a rate which forms a desired dilution of the bactericide. This is done prior to pumping the water into the oil bearing subterranean formation. Sampling and checking the water for sulfate reducing bacteria will show whether the chemical concentration needs to be raised or may be lowered to effect an elimination of sulfate reducing bacteria from the water.

Alternately, bis(2-aminoisobutoxy)phenylmethane utilized in our process may be added to the oil-bearing formations periodically, for example, once a week, as a high potency concentrate or the undiluted bis(2-aminoisobutoxy)phenylmethane may be injected into the formation.

We have found that bis(2-aminoisobutoxy)phenylmethane is active against some strains of sulfate reducing bacteria in water at concentrations as low as about 10–25 p.p.m. However, we prefer to utilize concentrations in excess of about 50–100 p.p.m. as we have found that even very resistant strains of *Desulfovibrio desulfuricans* are effectively controlled at these concentrations. Bis(2-aminoisobutoxy)phenylmethane is also active against other noxious microorganisms and control of these organisms can also be effected through the use of our process.

The following example sets out the procedure used in testing bis(2-aminoisobutoxy)phenylmethane for the control of sulfate reducing microorganisms. It is not intended that our invention be limited to the exact composition or concentrations shown. Rather, it is intended that all equivalents obvious to those skilled in the art be included within the scope of our invention as claimed.

*Example I*

In a water treatment plant, a water concentrate containing bis(2-aminoisobutoxy)phenylmethane is continually added to water to be pumped into subterranean oil-bearing formations at such a rate that a 100 p.p.m. solution of bis(2-aminoisobutoxy)phenylmethane is formed. The bis(2-aminoisobutoxy)phenylmethane treated flooding water is pumped into the oil-bearing formation and is completely effective in preventing bacterial plugging of the oil-bearing sands and the piping system utilized in the water flooding operations.

Now having described our invention what we claim is:

1. In the process of secondary oil recovery characterized by the step of injecting flooding water into oil-bearing subterranean formations to displace portions of the residual oil therein, the improvement comprising having present in said injected flooding water in excess of about 10–25 p.p.m. of bis(2 - aminoisobutoxy)phenylmethane to inhibit the growth of bacteria within said formations.

2. In a flooding process for the recovery of oil from oil-bearing subterranean formations, the improvement which comprises flooding the oil-bearing formations with an aqueous liquid containing in excess of about 50–100 p.p.m. of bis(2-aminoisobutoxy)phenylmethane.

References Cited in the file of this patent

UNITED STATES PATENTS

| | | |
|---|---|---|
| 2,692,231 | Stayner et al. | Oct. 19, 1954 |
| 2,839,467 | Hutchison et al. | June 17, 1958 |
| 2,882,227 | Lindberg | Apr. 14, 1959 |